United States Patent [19]
Gaskell et al.

[11] 3,804,608
[45] Apr. 16, 1974

[54] METHOD FOR MAKING GLASS CERAMIC MATERIALS

[75] Inventors: Philip Hedley Gaskell; Brain Paterson Tilley, both of Prescot; Philip Sidney Irlam, Southport; Robert Percy Miller, Sunbury-on-Thames; Thomas Ian Barry, Hampton Hill, all of England

[73] Assignee: Pilkington Brothers Limited, Liverpool, England

[22] Filed: May 23, 1972

[21] Appl. No.: 256,168

[30] Foreign Application Priority Data
May 24, 1971  Great Britain.................. 16682/71

[52] U.S. Cl..................... 65/33, 65/99 A, 106/39.7
[51] Int. Cl............................................... C03c 3/22
[58] Field of Search.......... 65/33, 99 A; 106/39 DV, 106/39.7

[56] References Cited
UNITED STATES PATENTS
3,201,266   8/1965   MacDowell..................... 65/33 X
3,241,985   3/1966   Kuwayama..................... 65/33 X
3,498,801   3/1970   Keul............................... 65/33 X
3,650,722   3/1972   Genisson....................... 65/99 A X Primary Examiner—Robert L. Lindsay, Jr.
Attorney, Agent, or Firm—Burns, Doane, Swecker & Mathis

[57] ABSTRACT

The invention relates to a method of manufacturing a fine-grained glass ceramic material from a thermally crystallisable vitreous material, which may be a composition of the $SiO_2$—$Al_2O_3$—$Li_2O$ or $SiO_2$—$Al_2O_3$—$BaO$ or $SiO_2$—$Al_2O_3$—$MgO$ systems containing a nucleating agent such as $P_2O_5$, $ZrO_2$ or $TiO_2$, in which method the material is melted, shaped to a desired form and thereafter supported throughout the subsequent thermal processing, which comprises rapidly cooling the shaped material to a temperature in the range which is conducive to fine-grained crystal growth in the material and regulating heat extraction from the material while in that range to induce the required degree of crystal growth, and then continuing cooling of the glass ceramic so produced. In some cases it is preferred to hold the temperature at a substantially constant value in that range for a time, generally not more than 30 minutes. In other cases heat extraction may be continued without interruption during crystallisation.

16 Claims, 2 Drawing Figures

METHOD FOR MAKING GLASS CERAMIC MATERIALS

BACKGROUND OF THE INVENTION

1. Field of the Invention

This invention relates to glass ceramic materials and methods of manufacturing those materials.

2. Description of the Prior Art

It is known to manufacture glass ceramic materials by controlled crystallisation of certain glasses. For example glass ceramic materials have been made by crystallisation of glasses of the following systems:

$SiO_2 - Al_2O_3 - Li_2O$
$SiO_2 - Al_2O_3 - MgO$
$SiO_2 - Al_2O_3 - BaO$

The glass usually contains a proportion of a nucleating oxide, for example $TiO_2$, $ZrO_2$ or $P_2O_5$.

The customary way of manufacturing glass ceramic material has been to melt the batch materials to form a homogeneous melt which has then been shaped by a conventional forming process, for example by moulding or extrusion. In the course of the moulding process the melt is cooled to a temperature at which it becomes a glass and holds its shape.

Thereafter the glass has been held for a time, sometimes a matter of hours, at a temperature at which a degree of nucleation develops in the material and then the nucleated material has been slowly heated at a rate, for example of 5°C per minute, to cause crystal growth to take place on the nuclei developed at the nucleation temperature. Crystal growth begins in these known processes while the glass is still sufficiently stiff to hold its shape and a low rate of temperature rise thereafter has always been necessary because as the temperature rises and the rate of crystallisation increases, a balance has to be struck between the increase in stiffness of the material due to its increasing crystallinity, and the decrease in viscosity of the vitreous matrix in which the crystal growth is taking place.

By this careful control of slow heating rate the preformed shape of the material is not modified during the crystallisation process. Further the slow heating rate helps to prevent damaging stresses being generated.

Usually a long process time, sometimes up to two or three hours or more, has been necessary in order to satisfy the requirements for preferred crystallisation without loss of form or cracking of the material.

SUMMARY

The present inventors have found that it is possible to produce a glass ceramic material without holding the material at a nucleation temperature and then heating the material to promote crystal growth, because there are thought to be structural characteristics within certain vitreous melts suitable for crystallisation to produce a glass ceramic or associated with early stages of crystallisation of that melt, which, if allowed to develop by the choice of an appropriate cooling temperature schedule, can result in controlled fine crystallisation during cooling of the thermally crystallisable melt through the temperature region which provides the best thermal conditions for fine crystalline growth.

It is thus a main object of the present invention to provide an improved process for producing fine-grained glass ceramic material by cooling a melt, which will require a shorter process time and which will permit a desired crystal phase to separate and a required degree of crystallinity and crystal size distribution to develop.

According to the invention a method of manufacturing ceramic material comprises forming a crystallisable melt of a vitreous material, shaping that melt to a desired form and thereafter maintaining support of the shaped material, rapidly cooling the shaped material to a temperature in the range which is conducive to fine-grained crystal growth in the material, regulating heat extraction from the material while its temperature is within that range to control the rate of exothermic heat generation as crystal growth proceeds and to induce fine-grained crystal growth to a required degree of crystallinity and crystallite size distribution by the time the material has cooled through that temperature range, and then continuing the cooling of the ceramic so produced. It has been found preferable when using certain vitreous compositions to hold the material at a substantially constant temperature within said range for a time to induce the required fine-grained crystal growth. Generally said time will not exceed 30 minutes.

With other vitreous compositions, it is found preferable for heat extraction to be continued without interruption while the temperature of the material is within said range, irrespective of any temperature rise produced by said exothermic heat generation.

Vitreous materials which have been found suitable for use in the method of the present invention include glasses of the $SiO_2 - Al_2O_3 - Li_2O$ system containing, in weight percentages, $SiO_2$ 75% to 90%, $Al_2O_3$ 1% to 9%, $Li_2O$ 7% to 13% and a nucleating oxide ($P_2O_5$, $ZrO_2$ or $TiO_2$) 2.5% to 4.5% and further glasses of the $SiO_2 - Al_2O_3 - Li_2O$ system containing, in weight percentages, $SiO_2$ 49% to 82%, $Al_2O_3$ 14% to 36%, $Li_2O$ 3% to 5%, $ZrO_2$ 0% to 10%, $TiO_2$ 0% to 12%, F 0% to 5%, and $P_2O_5$ 0% to 5%, the amount of $ZrO_2 + TiO_2 + F + P_2O_5$ present being from 3.5% to 15%, and the molar ratio $Li_2O:Al_2O_3$ being preferably 1 or less. Another range of vitreous materials which have been found capable of being crystallised to form a glass ceramic by the method of the present invention are glasses of the $SiO_2 - Al_2O_3 - BaO$ system containing, in weight percentages, $SiO_2$ 39% to 67%, $Al_2O_3$ 1% to 32% and BaO 5% to 39% with an effective amount of $TiO_2$ as a nucleating oxide. Another vitreous material which has been found usable, is a glass of the $SiO_2 - Al_2O_3 - MgO$ system containing, in weight percentages, $SiO_2$ 53.2%, $Al_2O_3$ 9.5%, MgO 22.4%, $TiO_2$ 10.8%, $K_2O$ 1.8% and $F_2$ 2.3%.

The shaped material may be cooled at a rate between 300°C $min^{-1}$ and 15°C $min^{-1}$ to said temperature within said range. Said temperature within said range may lie between Tg + 50°C and Tg + 350°C where Tg is the transformation temperature for the vitreous material.

Preferably the melt is poured on to a thermally conductive support and the cooling of the material through the said temperature range is carried out while the material remains on the support.

The thermal capacity and thermal conductivity of the support are factors which regulate dissipation of exothermic heat of crystallisation to ensure that the internal temperature of the material follows a preferred temperature/time profile. Certain materials produce fine crystals only over a limited range of temperatures. Above this range, crystallisation is coarse, below the range crystallisation is incomplete. Such materials often crystallise rapidly, causing a high rate of exothermic heat generation. With such materials a particularly high rate of heat extraction is preferable, so that the temperature of the material falls continuously in said temperature region, thereby limiting the rate of crystallisation with a consequent reduction in the rate of generation of exothermic heat of crystallisation, and ensuring that the internal temperature of the material does not rise to a value at which there is a high rate of crystal growth. The use of a support of high thermal capacity, e.g., a molten tin bath, further enhances dissipation of the exothermic heat. Minimisation of the exothermic heat of crystallisation also helps to prevent cracking.

There are some glass ceramic materials which crystallise slowly and others which have relatively low values of heat of crystallisation. When manufacturing these materials it is preferable to employ a thermal schedule which includes a slow rate of cooling through the temperature region of fine-grained crystal growth, or even to hold at a constant temperature within that range and to use a support of low thermal capacity and low thermal conductivity. This type of thermal schedule and support can also be used with those glasses (such as glasses 1 and 2 set out in Table 1 below) which even though crystallising rapidly, can produce a fine-grained crystalline ceramic.

DESCRIPTION OF THE PREFERRED EMBODIMENTS

The Examples which follow illustrate the manufacture of glass ceramic materials both by the continuous rapid cooling process according to the invention and by the cooling followed by the temperature holding process of the invention.

Figure 1:
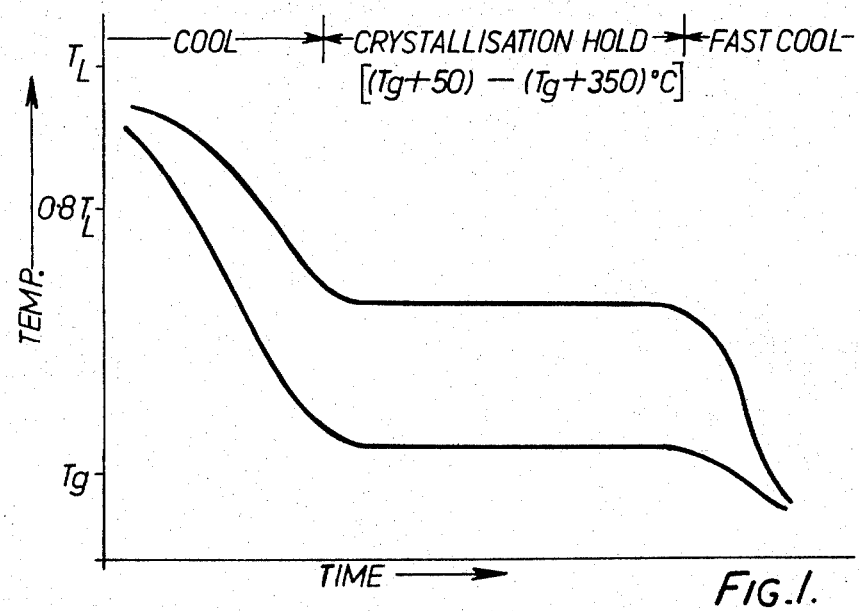
FIG. 1 is a diagram showing the temperature of the material plotted against time.

As illustrated in FIG. 1, the molten glass is first cooled rapidly to a crystallisation temperature which may lie between Tg + 50°C and Tg + 350°C. It is held at this temperature for a time dependent on the rate of crystallisation of the particular glass composition, and then cooled to a temperature at which it can be handled. Two curves are shown in FIG. 1 representing the treatment of the glass composition at the highest and the lowest crystallisation temperatures which are likely to be practicable.

The glass composition to be employed is first selected on known principles and by melting samples and cooling them at a rate of approximately 15° to 30°C min$^{-1}$. If a given sample does not crystallise the composition must be rejected, but if it produces bulk crystallisation of fine crystals the composition is prima facie likely to be usable and the optimum conditions applicable to it can be evaluated by further experiments.

If the composition crystallises to give coarse crystals the cooling rate may be increased up to about 300°C min$^{-1}$; if under these circumstances the samples do not crystallise or crystallise only partially, or in coarse crystals, then the composition is unsuitable for forming a glass ceramic by continuous cooling. If, however, a fine-grained material is obtained, it is likely to be useable and optimum conditions would be determined as before.

Figure 2:
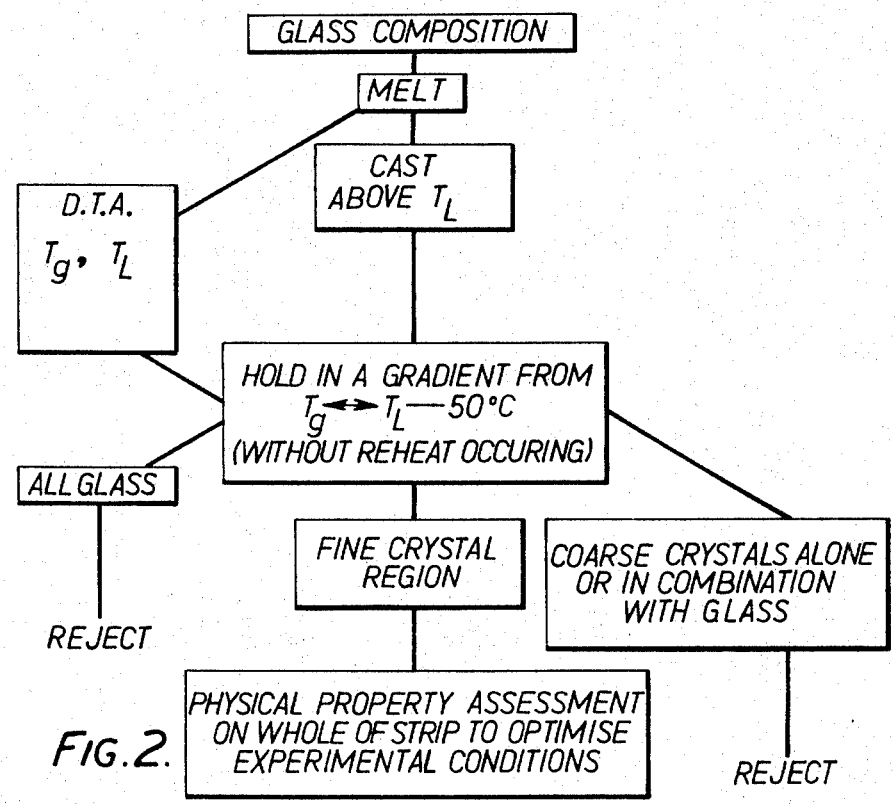
FIG. 2 illustrates diagrammatically the manner in which the optimum conditions applicable to a given glass composition can be ascertained.

A composition, tested in this way, which is found to be suitable for formation of a glass ceramic by continuous cooling, will also be suitable for the process which involves holding the material for a time at a substantially constant temperature during crystallisation. Furthermore, compositions which are found, on the basis of the above tests, to give inadequately crystallised products may be suitable when a hold at a constant temperature is employed. The method for selecting such compositions, shown diagrammatically in FIG. 2, is as follows:

The glass composition is melted and subjected to differential thermal analysis to determine the annealing endotherm Tg and the liquidus temperatures $T_L$. Strips of the glass are cast at a temperature above $T_L$ and rapidly cooled, in an apparatus which permits a temperature gradient to be established along the length of the strip, to a point at which the range of temperature in the strip extends from Tg at one end to $T_L$ −50°C at the other end. The strip is held at this range of temperatures without permitting any reheating for a given time, normally not greater than 30 minutes, and then cooled. If the strip is then found to consist merely of glass or of coarse crystals, along or in combination with glass, the composition must be rejected, but if a fine crystal region is found it can be related to the hold temperature applied to that region of the strip so as to indicate the optimum crystallisation temperature. Further assessment of the physical properties of the whole strip, and possible some further experiments, for instance increasing the time for which the glass is held at consistent temperature, will be necessary to optimise the operating conditions.

The thermally crystallisable melts which can be transformed into ceramic material by methods according to the invention cover a wide range of compositions. Materials containing SiO$_2$ and one or more of the components Al$_2$O$_3$, MgO, BaO, Li$_2$O and ZnO can be transformed into high strength fine-grained ceramic materials when subjected to one or other of the cooling processes according to the invention.

Table 1 sets out in percentages by weight a range of glass compositions which can be employed in the continuous rapid cooling process and in the process where the temperature is held at a temperature which is conducive to crystal growth in the material. In each of the glass compositions 1 to 17 set out in Table 1 there is a content of SiO$_2$, Al$_2$O$_3$ and Li$_2$O together with a content of one or more nucleating agents. Glasses 1 to 4 and 6 to 9 have a content of P$_2$O$_5$. In glasses Nos. 5 and 10 to 17 there is a content of ZrO$_2$. Compositions which are self-nucleating or which use other nucleating oxides, for example TiO$_2$, can be subjected to one of the cooling treatments. Glass No. 15 has TiO$_2$ as the principal nucleating oxide. Glasses 16 and 17 show the addition of fluorine to compositions containing SiO$_2$, Al$_2$O$_3$ and Li$_2$O.

In the preparation of a glass ceramic material from any one of Glasses 1 to 17 the glass composition is melted in customary manner at a temperature in the region of 1,500° to 1,700°C and the homogeneous melt which has formed is poured on to a thermally conductive support to shape the melt into the form of a glass sheet. Either a flat sheet of non-wettable platinum alloy could be used as the support or the support may be of

TABLE 1

| Glass No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| $SiO_2$ | 77.7 | 78.5 | 80.2 | 76.3 | 67.0 | 77.3 | 83.1 | 81.2 | 87 | 70.6 | 65.4 | 64.2 | 49.2 | 65.4 | 61.7 | 68.3 | 66.6 |
| $Al_2O_3$ | 3.9 | 3.9 | 5.8 | 8.7 | 18.7 | 8.7 | 5.8 | 2.9 | 1.9 | 15.1 | 18.5 | 18.2 | 29.8 | 24.3 | 15.3 | 17.6 | 18.6 |
| $Li_2O$ | 12.0 | 12.1 | 10.6 | 11.6 | 3.8 | 10.6 | 7.7 | 12.5 | 7.7 | 4.4 | 5.4 | 5.4 | 8.8 | 3.8 | 4.3 | 2.7 | 3.7 |
| $P_2O_5$ | 3.9 | 3.0 | 3.4 | 3.4 | | 3.4 | 3.4 | 3.4 | 3.4 | | | | | | | | 1.5 |
| $K_2O$ | 2.5 | 2.5 | | | 0.09 | | | | | | | | | | 0.1 | | 0.1 |
| $P_2O_3$ | | | | | | | | | | 3.6 | 4.5 | 6.1 | 6.1 | | 3.1 | 1.0 | 1.0 |
| $B_2O_3$ | | | | | | 6.9 | | | | 6.3 | 6.2 | 6.1 | 6.1 | 6.5 | 3.9 | 2.0 | 1.5 |
| $Na_2O$ | | | | | 0.39 | | | | | | | | | | 0.9 | 0.2 | 0.4 |
| $TiO_2$ | | | | | | | | | | | | | | | 10.7 | 2.0 | 1.5 |
| $ZnO$ | | | | | 3.1 | | | | | | | | | | | 2.0 | 1.5 |
| $MgO$ | | | | | | | | | | | | | | | | 2.4 | 3.1 |
| $F$ | | | | | | | | | | | | | | | | 1.8 | |
| | | | | | | | | | | | | | | | | 2.0 | |
| Tg | | 488 | 570 | 540 | | 508 | | | | 763 | 705 | 660 | | 779 | 540 | 705 | 726 | molten metal, for example molten tin or tin alloy, or a solid material, for example carbon.

The support, if made of a molten oxidisable metal or carbon or any other oxidisable solid material, is preferably enclosed in a protective atmosphere which may be an inert atmosphere or a reducing atmosphere, for example an atmosphere of 95% nitrogen and 5% hydrogen. Heat transfer takes place substantially uniformly over the whole support so that the whole of the material is subjected to the same thermal conditions. There is in each case a high rate of heat transfer between the supported material and the support which permits accurate control of the temperature profile to which the material is subjected. In the case of a molten tin support, heat from the material is absorbed into a larger thermal mass than when a thin platinum alloy sheet is used as a support. The thickness of the platinum alloy sheet or the depth of molten tin may be varied to regulate the thermal mass with which the material is in contact during its crystallisation.

The invention is particularly applicable to a continuous method of manufacturing a ceramic material comprising forming a melt of a thermally crystallisable vitreous material, continuously advancing a ribbon of that material along a non-wettable support, cooling the advancing ribbon rapidly to a temperature at which fine grain crystallisation occurs, maintaining the advancing ribbon substantially at that temperature for a limited time just sufficient to consolidate a required degree of crystallinity and thereafter cooling the ribbon of fine-grained ceramic so formed prior to its removal from the support.

A number of Examples of methods of manufacturing glass ceramic materials will now be given. Where the strength of the ceramic material produced is given, it is expressed in terms of the modulus of rupture which was measured in bending on an abraded sample of square cross-section. Expansion co-efficients were averaged over the temperature range 25°C to 500°C, the degree of crystallinity was obtained from an analysis of the intensity of X-ray scattering as determined by X-ray diffraction analysis of a powder sample in a focussing camera, and the crystallite size distribution was obtained by examination of an electron micrograph of a replicated fresh fracture surface of the ceramic.

EXAMPLE 1

A melt of Glass No. 1 was produced at 1,500°C and was poured on to a molten tin support. The melt spread on the tin surface at 1,280°C to form a sheet. The material in sheet form was then cooled at a rate of 65°C min$^{-1}$ to a temperature of 785°C and was held at that temperature for 30 minutes. The material crystallised to form a glass ceramic material and the sheet of ceramic was then cooled to handling temperature. The material had a modulus of rupture of 186 MN. m$^{-2}$ and an expansion coefficient of $160 \times 10^{-7}$ °C$^{-1}$ and a crystallite size distribution in the range 5 to 8 $\mu$m of the crystalline phases lithium metasilicate $Li_2SiO_3$, lithium disilicate $Li_2Si_2O_5$ and $\alpha$-cristobalite.

EXAMPLE 2

Glass No. 1 was melted at 1,500°C in the same way as described in Example 1 and a sheet was formed on a tin support at 1,250°C. The material was cooled at a rate of 60°C min$^{-1}$ to a temperature of 750°C where it was held for 30 minutes. The resulting ceramic had a modulus of rupture of 168 MN. m$^{-2}$ and consisted of crystallites ranging in size from 0.5 to 10 $\mu$m. The crystal phases present were lithium metasilicate, $\alpha$-cristobalite, lithium disilicate and lithium orthophosphate.

EXAMPLE 3

The procedure of Example 2 was followed and the sheet of Glass No. 1 was formed at 1,240°C and cooled at the rate of 58°C min$^{-1}$ to 710°C where it was held for 30 minutes. The ceramic so formed had a modulus of rupture of 149 MN. m$^{-2}$, and consisted mainly of crystallites in the size range 0.2 to 1 $\mu$m with some larger crystals of dimensions 5 to 10 $\mu$m. The crystal phases were the same as those found in Example 2.

Examples 1 to 3 show the influence of the hold temperature on the strength of the ceramic produced. Holding the material at a higher temperature, for example 750°C to 800°C results in a stronger material. It was found that by using a hold temperature between 700°C and 630°C a moderately crystalline material of lower strength could be produced but with a hold temperature below 630°C the material was mostly vitreous.

EXAMPLE 4

Glass No. 2, which is very similar in composition to Glass No. 1, but with slightly less $P_2O_5$, was melted at 1,500°C and poured onto a platinum alloy sheet support and was continuously cooled, without making any attempt to hold it at a crystallisation temperature, at an average rate of 27°C min$^{-1}$. The same crystalline phases were produced as in Example 1 with a crystallite size distribution of 1 to 2 $\mu$m and a modulus of rupture of 193 MN. m$^{-2}$. While heat extraction continued without interruption, largely through the platinum support, there was a temperature rise in the glass of several tens of degrees as crystallisation was taking place, due to the exothermic heat of crystallisation. The result of this generation of heat was to prolong the residence of the material, while still having heat extracted from it, in the temperature region which is conducive to the growth of small crystals.

EXAMPLE 5

Glass No. 2 was again melted at 1,500°C as in Example 4, and poured on to a platinum alloy sheet support, but in this case the average cooling rate was higher, at 43°C min$^{-1}$. The same crystalline phases were produced but the strength was less since the observed modulus of rupture was 160 MN. m$^{-2}$ and an expansion co-efficient of 89 × 10$^{-7}$ °C$^{-1}$. This indicates that the slower rate of 27°C min$^{-1}$ of Example 4 gave a product with better properties.

EXAMPLE 6

Glass No. 2 was used again in a method similar to that of Example 4 with the sheet formed at a temperature of 1,245°C, but in this instance, the melt was poured on to a molten tin support. The sheet was cooled at 33°C min$^{-1}$. The product was an opalescent white ceramic with crystal phases of lithium metasilicate and lithium disilicate with some uncrystallised glass. The modulus of rupture was 150 MN. m$^{-2}$ and the expansion coefficient was 90 × 10$^{-7}$ °C$^{-1}$. The thermal conditions impressed on the sheet were almost identical to those of Example 4, but because the support was of molten metal tin with a high thermal capacity and high thermal conductivity, the exothermic heat of crystallisation developed by the glass ceramic during crystallisation was rapidly absorbed. As a result, the dwell time of the ceramic material in the temperature range conducive to the rapid growth of a fine-grained crystalline material was insufficient to give a completely crystalline product.

For this composition, the degree of crystallinity is not critically dependent on its thermal treatment, so that even though there is some departure from the optimum conditions for glass ceramic formation, the product still has adequate crystallinity and acceptable mechanical and thermal properties. In other compositions which are mentioned below, the crystallisation kinetics are a more sensitive function of the thermal conditions and it then becomes necessary to match the crystallisation characteristics of the ceramic and the thermal characteristics of the environment (notably the support) to the cooling schedule so as to ensure that the glass has an adequate time in the temperature region conducive to fine crystal growth to form a fully crystalline material. With Glass No. 1 or 2, substantially complete crystallinity can be achieved by employing a thermal treatment in which there is a reduction in the rate of cooling through the temperature region conducive to the growth of fine, evenly dispersed crystals, i.e., from about 760°C to 800°C. The rate of cooling may be reduced to zero at a temperature between 760°C and 800°C for a period of time as in Example 1, to give a strong ceramic.

EXAMPLE 7

Glass No. 3 was melted at 1,600°C and formed into a sheet on a molten tin support at 1,240°C. The sheet was cooled at a rate of 68°C min$^{-1}$ to a hold temperature in the region of 815°C and was held at that temperature for 17.5 minutes. The modulus of rupture of the ceramic produced was 117 MN. m$^{-2}$. The crystal phases were α-cristobalite, lithium disilicate, β-quartz solid solution and a trace of lithium metaphosphate with a size distribution of 0.1 to 1 μm.

EXAMPLE 8

Glass No. 3 was formed at 1,170°C and was cooled at a rate of 70°C min$^{-1}$ to 705°C where it was held for 17.5 minutes. The modulus of rupture was 117 MN. m$^{-2}$ and the ceramic consisted of crystals of β-quartz solid solution, α-cristobalite and lithium metasilicate with a size distribution of 3 to 4 μm.

EXAMPLE 9

Glass No. 3 was formed into a sheet on a molten tin support at 1,100°C and cooled at 70°C min$^{-1}$ to a temperature in the region of 675°C and was held at that temperature for 17.5 minutes. The modulus of rupture was 139 MN. m$^{-2}$. The crystal size distribution was 0.2 to 2 μm with the same crystal phases as before.

These three Examples again show the effect of hold temperature on the strength of the material.

EXAMPLE 10

Glass No. 4 was melted at 1,600°C and formed on a molten tin support at 1,150°C and then cooled at 55°C min$^{-1}$ to a temperature of 865°C where it was held for 12 minutes. The resulting ceramic had a modulus of rupture of 103 MN. m$^{-2}$ and consisted of crystals of β-quartz solid solution, α-cristobalite, lithium metasilicate and a small amount of lithium disilicate. The crystals were approximately 2 μm in size.

EXAMPLE 11

Glass No. 5 was melted at 1,700°C and formed on a molten tin support at 1,400°C and then cooled at the rate of 64°C min$^{-1}$ to 950°C and held at that temperature for 10 minutes. The crystalline phases present were β-eucryptite solid solution, zirconia and a trace of β-spodumeme. The modulus of rupture was 64 MN. m$^{-2}$.

Similar procedures were applied to Glasses 6, 7, 8, 9, 16 and 17, each of which yielded a useful ceramic material.

The following Examples 12 to 15 were all carried out by pouring the melt on to a molten tin surface and allowing the melt to flow to form a ribbon and then subjecting the melt to a temperature profile which consisted of a rapid cooling to a predetermined temperature within the crystallisation range which temperature is conducive to growth of small crystals in the material, which range is normally between 600°C and 1,100°C, for a time producing a required degree of crystallinity and crystal size distribution. Then cooling was continued until the ceramic produced was cool enough to be handled.

These experiments which will now be described indicated that a rapid cooling from forming temperature is desirable to prevent uncontrolled crystallisation in the upper temperatures of the crystallisation range so that crystal growth takes place from a large number of small crystals. The important parameter is the temperature at which the material is held during crystallisation and the effect of different hold temperatures on the strength of the material will be apparent from the Examples.

EXAMPLE 12

Glass No. 10 which contains 3.6% by weight of B$_2$O$_3$ and a proportion of ZrO$_3$ was melted at 1,600°C and was formed at 1,420°C into a sheet and then cooled at a rate of 60°C min$^{-1}$ to a temperature in the region of 905°C where it was held for 30 minutes. The resulting material had a modulus of rupture of 69 MN. m$^{-2}$, and contained β-eucryptite solid solution and tetragonal zirconia as crystal phases.

Other treatments using modifications of Glass No. 10 but with lower concentrations of boric oxide also gave a ceramic material but the material was extremely weak and the ceramic could only be developed at a temperature approaching 1,000°C. Furthermore, the range of temperatures over which ceramic formation took place was very narrow, leading to considerable difficulties in controlling the process. Additions of boric oxide, by modifying the kinetics of crystallisation, reduce the temperature for formation of ceramic and also increase the range of temperatures over which a ceramic is formed.

EXAMPLE 13

Glass No. 11 was melted at 1,600°C and formed into a sheet on a molten tin support at 1,400°C. The sheet was cooled at the rate of 150°C min$^{-1}$ to 960°C and was held at that temperature for 30 minutes. The crystalline phases were β-eucryptite solid solution and $ZrO_2$ with a crystallite size of 0.5 to 2 μm, modulus of rupture of 90 MN. m$^{-2}$ and expansion co-efficient of $-7 \times 10^{-7}$ °C$^{-1}$.

Under the same conditions the formed sheet was cooled at the rate of 150°C min$^{-1}$ to 875°C which temperature was held for 30 minutes. The same crystalline phases were produced with a crystal size of 0.2 μm to 5 μm and a modulus of rupture of 110 MN. m$^{-2}$ and an expansion co-efficient of $7 \times 10^{-7}$ °C$^{-1}$.

When the sheet was formed at 1,350°C and cooled at the same rapid rate of 150°C min$^{-1}$ to about 830°C where it was held for 30 minutes a similar ceramic material with a modulus of rupture of 97 MN. m$^{-2}$ was produced with crystals of the same species as before with a size distribution of 1 μm to 3 μm.

This illustrates the effect of varying the temperature at which the material is held, on the strength of the material and a maximum strength was observed with a hold temperature around 870°C.

EXAMPLE 14

Glass No. 12 which has a similar composition to Glass No. 11 but with an increased concentration of boric oxide was melted at 1,600°C and poured on to molten tin at 1,400°C. It was then cooled at 60°C min$^{-1}$ to a temperature of 807°C and held at that temperature for 30 minutes. The resulting ceramic had a modulus of rupture of 101 MN. m$^{-2}$, and consisted of crystals of β-eucryptite solid solution with some tetragonal zirconia. Crystal size was in the range 1 μm to 3 μm.

When the sheet was formed at 1,400° and cooled at 100°C min$^{-1}$ to a temperature of 815° the ceramic consisted of the same crystal phases in the size range 2 μm to 5 μm. The modulus of rupture was 95 MN. m$^{-2}$.

This Example again illustrates the beneficial effect of an increase in the concentration of boric oxide. The ceramic produced from Glass No. 12 was of similar strength and had the same crystal phases present as that produced from Glass No. 11 but the ceramic was developed at a much lower temperature.

EXAMPLE 15

Strong ceramic materials were produced using Glass No. 13 which was melted at 1,600°C and formed into a sheet at 1,400°C. The sheet was then cooled at the rate of 50°C in three separate procedures and was held at a hold temperature for 20 minutes. When the hold temperature was about 850°C the ceramic material produced had a modulus of rupture of 125 MN. m$^{-2}$, an expansion co-efficient of $0.1 \times 10^{-7}$ °C$^{-1}$ and consisted of crystallites of β-eucryptite and zirconia with sizes below 5 μm. When the hold temperature was about 800°C the modulus of rupture was 122.6 MN. m$^{-2}$ and when the hold temperature was 760°C the modulus of rupture was 106 MN. m$^{-2}$. The crystal phases were again β-eucryptite and zirconia. These results again show the effect of varying the hold temperature on variation in the strength of the glass and the strongest glass was produced when the glass was held at about 850°C.

A ceramic was also made by pouring Glass No. 13 on to molten tin at a temperature of 1,260° and cooling therefrom through the range conducive to fine crystal growth at an average temperature of 34°C min$^{-1}$. The ceramic product had a strength of 69 MN. m$^{-2}$ and consisted of crystallites of β-eucryptite and zirconia, with sizes ranging from 0.5 μm to 2.0 μm, and some larger crystals of size 5 μm to 10 μm. The expansion coefficient was $-12 \times 10^{-7}$ °C$^{-1}$. This material, although substantially crystalline, was considerably weaker than the Examples quoted above in which the material was held for 20 minutes. This is probably the result of a relatively slower cooling rate through the temperature region of rapid crystal growth which had induced the formation of a proportion of large crystals.

EXAMPLE 16

Glass No. 14 was melted at 1,730°C and formed into a sheet at 1,650°C. The sheet was cooled rapidly at a rate of 300°C min$^{-1}$ to 900°C and then held at that temperature for 30 minutes, and a strong material resulted, the modulus of rupture being 76 MN. m$^{-2}$. Crystals present were β-eucryptite solid solution, tetragonal zirconia and a trace of β-spodumene with sizes in the range 3 μm to 10 μm. It was found that the supported material had to be cooled below about 1,050°C and held at a temperature below that value in order to produce a ceramic material, but materials held at temperatures below about 800°C gave vitreous products. This is an example of a material which produces a fine-grained product over a very narrow range of temperatures.

EXAMPLE 17

Glass No. 15 was melted and formed at a temperature of 1,340°C into layer form and then cooled at 20°C min$^{-1}$. The resulting ceramic had β-spodumene and zircon as crystalline phases with a crystal size in the range 1 μm to 2 μm, and a modulus of rupture of 81 MN. m$^{-2}$.

Similar procedures including holding at a crystallisation temperature were applied to each of Glasses 18 to 27 whose compositions are set out in Table II, in percentages by weight. These glasses are all of the $SiO_2$ — $Al_2O_3$ — BaO system.

Each glass was formed at a temperature in the range 1,300°C to 1,400°C and then cooled through a temperature range of 1,050°C to 700°C, with temperature holding as appropriate to induce the required fine-grained crystal growth, as in the following Example.

TABLE II

| Glass No. | 18 | 19 | 20 | 21 | 22 | 23 | 24 | 25 | 26 | 27 |
|---|---|---|---|---|---|---|---|---|---|---|
| $SiO_2$ | 47.9 | 52.1 | 56.3 | 43.7 | 52.1 | 56.1 | 52.1 | 43.7 | 39.5 | 56.3 |
| $Al_2O_3$ | 26.7 | 10.1 | 10.1 | 1.7 | 1.7 | 1.7 | 26.9 | 26.9 | 22.7 | 22.7 |
| BaO | 9.4 | 21.8 | 17.6 | 38.6 | 30.2 | 26.2 | 5.0 | 13.4 | 21.8 | 5.0 |
| $TiO_2$ | 11.3 | 11.3 | 11.3 | 11.3 | 11.3 | 11.3 | 11.3 | 11.3 | 11.3 | 11.3 |
| MgO | 4.7 | 4.7 | 4.7 | 4.7 | 4.7 | 4.7 | 4.7 | 4.7 | 4.7 | 4.7 |

EXAMPLE 18

Glass No. 18 was melted at 1,700°C and after cooling was held at 820°C for 30 minutes. The crystalline phases in the resulting ceramic material were magnesium aluminium titanate and rutile, the crystal size being 0.1 μm. The modulus of rupture was 82.6 MN. m$^{-2}$.

Crystallisable melts of other compositions can be subjected to the process of the invention. Glasses of the $SiO_2$ — $Al_2O_3$ — MgO system are susceptible to fine-grained crystal growth by this method, for example a glass having the following composition, in percentages by weight:

| | |
|---|---|
| $SiO_2$ | 53.2% |
| $Al_2O_3$ | 9.5% |
| MgO | 22.4% |
| $TiO_2$ | 10.8% |
| $K_2O$ | 1.8% |
| $F_2$ | 2.3% |

An Example of the treatment of this glass is as follows:

EXAMPLE 19

The glass was melted at 1,600°C and a sheet formed at 1,200°C and then cooled at 25°C min$^{-1}$ to 920°C and held at that temperature for 12.5 minutes had a modulus of rupture of 32 MN. m$^{-2}$. The crystal phases were protoenstatite and rutile, crystal size being greater than 20 μm. When the same glass was poured at 1,600°C on to tin at 950°C, thereby cooling the glass quickly to 950°, and then cooled at the rate of 15°C min$^{-1}$ to 770°C and held for 12.5 minutes, the ceramic had a modulus of rupture of 152 MN. m$^{-2}$ and an expansion coefficient of 58 × 10$^{-7}$ °C$^{-1}$.

A sheet of this material was also formed by cooling directly from a forming temperature of 1,150°C through the range conducive to fine crystal growth at a temperature of 37°C min$^{-1}$. The product had a modulus of rupture of 99 MN. m$^{-2}$ and an expansion coefficient of 56 × 10$^{-7}$ °C$^{-1}$.

The rapid cooling method according to the invention in which the melt is cooled rapidly to a temperature at which crystal growth is relatively slow, so that a large number of small crystals are formed, thus provides a new technique for the production of glass ceramic materials of high strength with accurate control possible of the thermal expansion characteristics of the ceramic produced.

We claim:

1. A method of manufacturing a glass ceramic material comprising forming a crystallisable melt of a vitreous material selected from glasses of the $SiO_2$ — $Al_2O_3$ — $Li_2O$, the $SiO_2$ — $Al_2O_3$ — BaO and the $SiO_2$ — $Al_2O_3$ — MgO systems, and containing a nucleating agent, shaping that melt to a desired form and thereafter maintaining support of the shaped material, rapidly cooling the shaped material at a rate between 300°C. min$^{-1}$ and 15°C. min$^{-1}$ to a temperature in the range between $T_g + 50$°C. and $T_g + 350$°C. conducive to fine-grained crystal growth in the material, where $T_g$ is the transformation temperature of the vitreous material, regulating heat extraction from the material while its temperature is within that range to control the rate of exothermic heat generation as crystal growth proceeds and to induce fine-grained crystal growth to a required degree of crystallinity and crystallite size distribution by the time the material has cooled through that temperature range, and then continuing the cooling of the glass ceramic so produced.

2. A continuous method of manufacturing a glass ceramic material comprising forming a melt of a thermally crystallisable vitreous material selected from glasses of the $SiO_2$ — $Al_2O_3$ — $Li_2O$ system, the $SiO_2$ — $Al_2O_3$ — BaO system and the $SiO_2$ — $Al_2O_3$ — MgO system, and containing a nucleating agent, continuously advancing a ribbon of that material along a non-wettable support, cooling the advancing ribbon rapidly at a rate between 15°C. min$^{-1}$ and 300°C. min$^{-1}$ to a temperature in the range between $T_g + 50$°C. and $T_g + 350$°C. at which fine grain crystallisation occurs, where $T_g$ is the transformation temperature of the vitreous material, maintaining the advancing ribbon substantially at that temperature for a limited time just sufficient to consolidate a required degree of crystallinity and thereafter cooling the ribbon of fine-grained ceramic so formed prior to its removal from the support.

3. A method of manufacturing a glass ceramic material, comprising (a) forming a crystallisable melt of vitreous material selected from the group comprising glasses of the $SiO_2$ — $Al_2O_3$ — $Li_2O$ system containing in weight percentages, $SiO_2$ 75% to 90%, $Al_2O_3$ 1% to 9%, $Li_2O$ 7% to 13% and a nucleating oxide ($P_2O_5$, $ZrO_2$ or $TiO_2$) 2.5% to 4.5%, glasses of the said $SiO_2$ — $Al_2O_3$ — $Li_2O$ system containing, in weight percentages, $SiO_2$ 49% to 82%, $Al_2O_3$ 14% to 36%, $Li_2O$ 3% to 5%, $ZrO_2$ 0% to 10%, $TiO_2$ 0% to 12%, F 0% to 5% and $P_2O_5$ 0% to 5%, the amount of $ZrO_2 + TiO_2 + F + P_2O_5$ present being from 3.5% to 15%, glasses of the $SiO_2$ — $Al_2O_3$ — BaO system containing, in weight percentages, $SiO_2$ 39% to 67%, $Al_2O_3$ 1% to 32% and BaO 5% to 39% with an effective amount of $TiO_2$ as a nucleating oxide, and a glass of the $SiO_2$ — $Al_2O_3$ — MgO system containing, in weight percentages, $SiO_2$ 53.2%, $Al_2O_3$ 9.5%, MgO 22.4%, $TiO_2$ 10.8%, $K_2O$ 1.8% and $F_2$ 2.3%, b. shaping the said melt to a desired form and thereafter maintaining support of the shaped material, c. rapidly cooling the shaped material at a rate between 15°C. min$^{-1}$ and 300°C. min$^{-1}$ d. to a temperature in the range between Tg + 50°C. and Tg + 350°C. conducive to fine-grained crystal growth in the vitreous material, where Tg is the transformation temperature of the vitreous material, e. regulating heat extraction from the vitreous material while its temperature is within the said range to control the rate of exothermic heat generation as crystal growth proceeds and to induce fine-grained crystal growth to a required degree of crystallinity and crystallite size distribution by the time the material has cooled through the said temperature range, and f. continuing the cooling of the glass ceramic so produced.

4. A method according to claim 3, wherein the melt is of a glass of the said $SiO_2 - Al_2O_3 - Li_2O$ system containing $SiO_2$ 49% to 82%, $Al_2O_3$ 14% to 36% and $Li_2O$ 3% to 5%, wherein the molar ratio $Li_2O:Al_2O_3$ is 1 or less.

5. A method according to claim 3, comprising holding the material at a substantially constant temperature within said range for a time to induce the required fine-grained crystal growth.

6. A method according to claim 5, wherein said time does not exceed 30 minutes.

7. A method according to claim 3, wherein heat extraction is continued without interruption while the temperature of the material is within said range, irrespective of any temperature rise produced by said exothermic heat generation.

8. A method according to claim 3, wherein the melt is poured on to a thermally conductive support and the cooling of the material through the said temperature range is carried out while the material remains on the support.

9. A method according to claim 8, wherein the support is a flat sheet of metal.

10. A method according to claim 9, wherein the metal is platinum alloy.

11. A method according to claim 8, wherein the support is of molten metal.

12. A method according to claim 11, wherein the molten metal is tin or a tin alloy.

13. A method according to claim 8, wherein the support is of carbon.

14. A method according to claim 3, wherein the composition of the melt is, in percentages by weight:

| | |
|---|---|
| $SiO_2$ | 76.3% to 87% |
| $Al_2O_3$ | 1% to 8.7% |
| $Li_2O$ | 7.7% to 12.5% |
| $P_2O_5$ | 3.0% to 3.9% |

15. A method according to claim 3, wherein the composition of the melt is, in percentages by weight:

| | |
|---|---|
| $SiO_2$ | 49.2% to 70.6% |
| $Al_2O_3$ | 15.1% to 33.6% |
| $Li_2O$ | 3.8% to 4.3% |
| $B_2O_3$ | 0% to 6.1% |
| $ZrO_2$ | 3.5% to 6.9% |
| $TiO_2$ | 0% to 10.7% |

16. A method according to claim 3, wherein the composition of the melt is, in percentages by weight:

| | |
|---|---|
| $SiO_2$ | 39.5% to 56.3% |
| $Al_2O_3$ | 1.7% to 26.9% |
| BaO | 5% to 38.6% |
| $TiO_2$ | 11.3% |
| MgO | 4.7% |

* * * * *